US009497335B2

(12) United States Patent
Matsuo et al.

(10) Patent No.: US 9,497,335 B2
(45) Date of Patent: Nov. 15, 2016

(54) NON-TRANSITORY STORAGE MEDIUM STORING INSTRUCTIONS EXECUTABLE BY INFORMATION PROCESSING APPARATUS, AND THE INFORMATION PROCESSING APPARATUS

(71) Applicant: BROTHER KOGYO KABUSHIKI KAISHA, Nagoya-shi, Aichi-ken (JP)

(72) Inventors: Yu Matsuo, Nagoya (JP); Takafumi Kai, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/666,034

(22) Filed: Mar. 23, 2015

(65) Prior Publication Data
US 2015/0281477 A1    Oct. 1, 2015

(30) Foreign Application Priority Data
Mar. 25, 2014  (JP) ................................. 2014-061796

(51) Int. Cl.
*H04N 1/00*  (2006.01)
*H04N 1/32*  (2006.01)

(52) U.S. Cl.
CPC ...... *H04N 1/00244* (2013.01); *H04N 1/00217* (2013.01); *H04N 1/00464* (2013.01); *H04N 1/00474* (2013.01); *H04N 1/00965* (2013.01); *H04N 1/32566* (2013.01)

(58) Field of Classification Search
USPC ..................... 358/498, 1.15, 1.18, 1.16, 1.17
See application file for complete search history.

(56) References Cited

U.S. PATENT DOCUMENTS

| 5,911,044 A *    | 6/1999 | Lo ...................... H04N 1/00236 709/203 |
| 2001/0015823 A1* | 8/2001 | Sato ................... H04N 1/00917 358/1.15 |
| 2008/0204827 A1* | 8/2008 | Yoshio ............... H04N 1/00212 358/498 |
| 2015/0149337 A1* | 5/2015 | Nishiyama ............. G06Q 10/00 705/35 |

FOREIGN PATENT DOCUMENTS

JP    2005-084701 A    3/2005

\* cited by examiner

*Primary Examiner* — Jerome Grant, II
(74) *Attorney, Agent, or Firm* — Merchant & Gould P.C.

(57) ABSTRACT

A non-transitory storage medium stores control programs. The programs cause an information processing apparatus to: acquire an instruction for the information processing apparatus, based on a reception of the operation by the receiver; determine, based on the acquired instruction, whether a content to be transmitted to a web server is determined to be one of a first content which is created by an external reading apparatus and which is not stored at the acquisition of the instruction and a second content which is stored at the acquisition of the instruction; when the content to be transmitted to the web server is determined to be the first content, output a request for the first content and acquire the first content; and output first content location information indicating a location of the acquired first content.

14 Claims, 12 Drawing Sheets

NON-TRANSITORY STORAGE MEDIUM STORING INSTRUCTIONS EXECUTABLE BY INFORMATION PROCESSING APPARATUS, AND THE INFORMATION PROCESSING APPARATUS

CROSS REFERENCE TO RELATED APPLICATION

The present application claims priority from Japanese Patent Application No. 2014-061796, which was filed on Mar. 25, 2014, the disclosure of which is herein incorporated by reference in its entirety.

BACKGROUND

Technical Field

The present invention relates to an information processing apparatus communicable with a web server and to a non-transitory storage medium storing a plurality of control programs executable by a processor of the information processing apparatus.

Description of the Related Art

There is known an information processing apparatus communicable with a web server and capable of uploading a content stored in the information processing apparatus, to the web server.

SUMMARY

However, in the case where a content constituted by scan data indicative of a particular document (hereinafter may be referred to as "scan content") is not stored in the information processing apparatus, the information processing apparatus stores scan data obtained from, e.g., a scanner, into a specific folder as the scan content, and when the scan content stored in the specific folder is selected on, e.g., a selection screen, the scan content is uploaded to the web server. Thus, when the scan content is uploaded to the web server, a large number of user operations are required, resulting in low operability. Accordingly, an aspect of the disclosure relates to a technique for improving operability when a scan content is uploaded to a web server.

In one aspect of the disclosure, a non-transitory storage medium stores a plurality of control programs executable by a processor of an information processing apparatus. The information processing apparatus includes: a communication device communicable with a reading apparatus; a first storage configured to store a content; a second storage configured to store a web browser program; a receiver configured to accept an user operation and provide an input corresponding to the user operation; and a display. The web browser program, when executed by the processor, causes the information processing apparatus to execute a web-browser processing in which the information processing apparatus: displays a web screen including a particular icon on the display; and receives an input designating the particular icon from the receiver. The plurality of control programs, when executed by the processor, cause the information processing apparatus to execute: an instruction acquisition processing in which the information processing apparatus acquires an instruction for the information processing apparatus, based on that the information processing apparatus, in the web-browser processing, receives the input designating the particular icon from the receiver; a determination processing in which the information processing apparatus determines, based on the instruction acquired in the instruction acquisition processing, whether a content to be transmitted to a web server is determined to be one of (i) a first content which is created by the reading apparatus and which is not stored in the first storage when the instruction is acquired and (ii) a second content which is stored in the first storage when the instruction is acquired; a content acquisition processing in which when the content to be transmitted to the web server is determined to be the first content in the determination processing, the information processing apparatus outputs a request for the first content and acquires the first content which is created by the reading apparatus as a response to the request for the first content; and a first-content-location-information output processing in which the information processing apparatus outputs first content location information indicating a location of the first content acquired in the content acquisition processing. The first content location information, output in the first-caontent location-information output processing, is processed in the web-browser processing.

In another aspect of the disclosure, an information processing apparatus includes: a communication device communicable with a reading apparatus; a first storage configured to store a content; a second storage configured to store a web browser program; a receiver configured to accept an user operation and provide an input corresponding to the user operation; a display; and a controller. The web browser program, when executed by the processor, causes the information processing apparatus to execute a web-browser processing in which the information processing apparatus: displays a web screen including a particular icon on the display; and receives an input designating the particular icon from the receiver. The controller is configured to cause the information processing apparatus to execute: an instruction acquisition processing in which the information processing apparatus acquires an instruction for the information processing apparatus, based on that the information processing apparatus, in the web-browser processing, receives the input designating the particular icon from the receiver; a determination processing in which the information processing apparatus determines, based on the instruction acquired in the instruction acquisition processing, whether a content to be transmitted to a web server is determined to be one of (i) a first content which is created by the reading apparatus and which is not stored in the first storage when the instruction is acquired and (ii) a second content which is stored in the first storage when the instruction is acquired; a content acquisition processing in which when the content to be transmitted to the web server is determined to be the first content in the determination processing, the information processing apparatus outputs a request for the first content and acquires the first content which is created by the reading apparatus as a response to the request for the first content; and a first-content-location-information output processing in which the information processing apparatus outputs first content location information indicating a location of the first content acquired in the content acquisition processing. The first content location information, output in the first-caontent location-information output processing, is processed in the web-browser processing.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Configuration of Communication System

Figure 1:
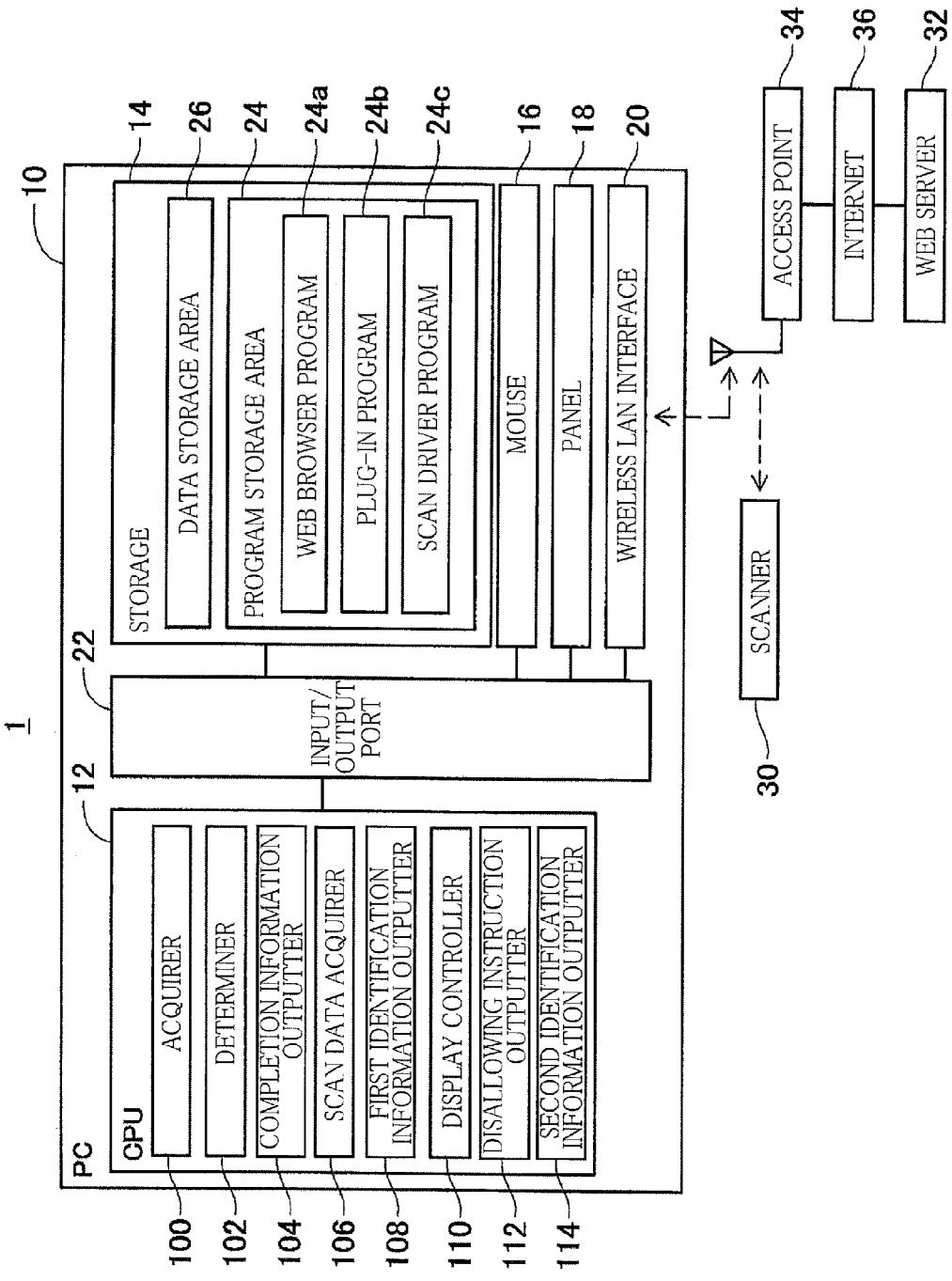
FIG. 1 is a block diagram illustrating a communication system.

FIG. 1 illustrates a communication system 1 according to a first embodiment. The communication system 1 includes a PC 10 (Personal Computer) as one example of an information processing apparatus, a scanner 30, a web server 32, and an access point 34. Each of the PC 10 and the scanner 30 can function as a well-known wireless-LAN terminal device and can transmit and receive data to and from each other via the access point 34. The access point 34 has a router function. Thus, each of the PC 10 and the scanner 30 is also connected to the web server 32 over the Internet 36.

A configuration of the PC 10 will be explained. The PC 10 includes: a CPU 12 (Central Processing Unit) as one example of a controller, a computer, an executer of a web browser program, an executer of a plurality of control programs, and a processor configured to execute a scanner driver; a storage device 14; a mouse 16 as one example of a receiver; a panel 18 as one example of a display; and a wireless LAN interface 20 as one example of a communication device. These devices are communicable with each other via an input/output port 22.

The wireless LAN interface 20 can perform wireless communication in an infrastructure mode of wireless LAN. The wireless communication is Wi-Fi® wireless communication according to IEEE 802.11 and standards equivalent to it. The PC 10 can perform data communication with the scanner 30 and the web server 32 via the access point 34.

The storage device 14 has a program storage area 24 as one example of a second storage. The program storage area 24 stores a web browser program 24a as one example of a web browser program, a plug-in program 24b as one example of the plurality of control programs, and a scan driver program 24c as one example of a scan driver. The web browser program 24a is a program for analyzing HTML data acquired or retrieved from a web, to display a web page. The plug-in program 24b is a plug-in program for the web browser program 24a and can transfer commands with the web browser program 24a and the scan driver program 24c.

Upon receiving a command from the plug-in program 24b, the scan driver program 24c causes the scanner 30 to execute a scan processing to send the plug-in program 24b scan data created in the scan processing.

The storage device 14 also has a data storage area 26 as one example of a first storage. The data storage area 26 stores contents each constituted by, e.g., image data, and data required for execution of the web browser program 24a, for example. It is noted that each of the contents is selectively stored in a corresponding one of folders created in the data storage area 26. The storage device 14 is constituted by combination of a RAM (Random Access Memory), a ROM (Read Only Memory), a flash memory, a HDD (Hard Disk), a buffer provided for the CPU 12, and other similar devices.

The CPU 12 executes processings according to, e.g., the web browser program 24a. Hereinafter, the CPU 12 that executes programs such as the web browser program 24a may be simply referred to as the name of the program. For example, the wording "the web browser program 24a executes" may mean "the CPU 12 that executes the web browser program 24a executes".

The panel 18 displays images based on image data, for example. The mouse 16 is a device for moving a point displayed on the panel 18 and capable of receiving a click operation performed by a user.

Upload of Content in Communication System

Figure 2:
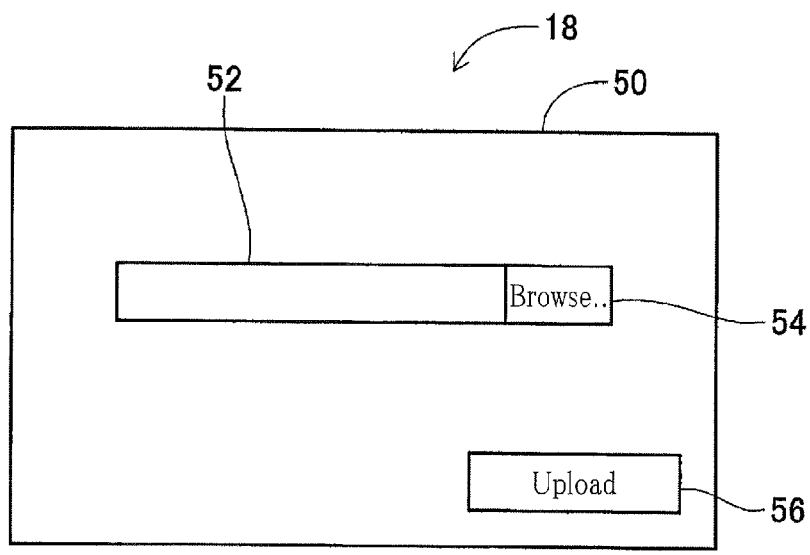
FIG. 2 is a view illustrating an upload screen.
Figure 3:
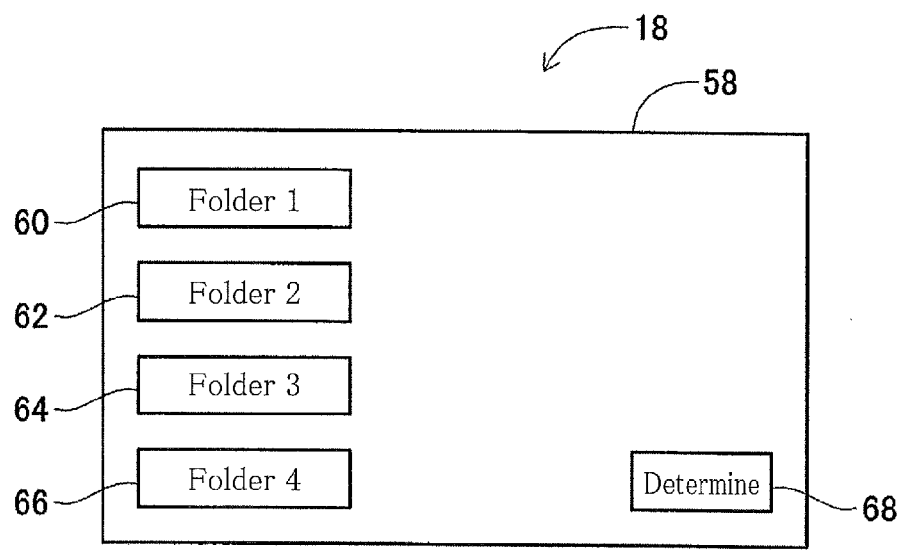
FIG. 3 is a view illustrating a content selection screen.

In the communication system 1, the web browser program 24a is executed by the PC 10 to upload the contents stored in the data storage area 26 of the PC 10 (hereinafter may be referred to as "stored contents") to the web server 32. Specifically, as illustrated in FIG. 2, when the web browser program 24a is executed, the panel 18 displays an upload screen 50 as one example of a web screen. The upload screen 50 contains a file-path display field 52, a browse (reference) button 54 as one example of at least one icon, and an upload button 56. When the user moves the pointer onto the browse button 54 using the mouse 16 and left-clicks the browse button 54, as illustrated in FIG. 3, the panel 18 displays a content selection screen 58 as one example of a second screen. It is noted that a user operation of moving the pointer onto a certain button displayed on the panel 18 and left-clicking the button may be hereinafter simply referred to as "left-click on the certain button" or "the user left-clicks the certain button".

The content selection screen 58 contains a plurality of folder determination buttons 60, 62, 64, 66 (each as one example of second content location information) and a determination button 68. Each of the folder determination buttons 60, 62, 64, 66 is a button for the user to select a content stored in a corresponding one of the folders. When any of the folder determination buttons 60, 62, 64, 66 is left-clicked, the name of each content stored in the folder corresponding to the operated button is displayed on the content selection screen 58. When the user left-clicks one of the displayed content names, the content corresponding to it is selected.

When the determination button 68 is left-clicked on the content selection screen 58 in the state in which the content is selected, the panel 18 displays the upload screen 50 instead of the content selection screen 58. On the file-path display field 52 contained in this upload screen 50, the name of a file path for the content selected on the content selection screen 58 (noted that the file path name is another example of the second content location information) is displayed. When the upload button 56 is left-clicked in this state, the content identified by the file path name, i.e., the content selected on the content selection screen 58 is uploaded to the web server 32.

In the communication system 1 as described above, the contents stored in the data storage area 26 of the PC 10 (as one example of second content) are uploaded to the web server 32. In the case where a content constituted by scan data indicative of a certain document (noted that this content may be hereafter referred to as "scan content", and this scan content is one example of first content) is not stored in the data storage area 26, the following operations are conventionally performed: the PC 10 stores scan data obtained from, e.g., the scanner 30, into a predetermined folder as the scan content; then the user selects the scan content from the predetermined folder on the content selection screen 58; and the scan content is uploaded to the web server 32.

Specifically, in the case where scan data obtained from the scanner 30 is stored by the PC 10 into Folder 1 as the scan content, for example, the user left-clicks the browse button 54 on the upload screen 50 to display the content selection screen 58 on the panel 18. The user then left-clicks a folder determination button 60 on the content selection screen 58 to select the scan content. The user then left-clicks the determination button 68 to display the upload screen 50 on the panel 18. The user then left-clicks the upload button 56 on the upload screen 50 to upload the scan content to the web server 32.

To upload the scan content to the web server 32 in the conventional manner, a large number of user operations are required as described above, resulting in low operability. To solve this problem, the PC 10 employs the plug-in program 24*b* for adding, to the web browser program 24*a*, a function for causing the scanner 30 to execute the scan processing and then uploading the scan data created in the scan processing to the web server 32.

There will be next explained a technique for uploading the scan content to the web server 32 according to the plug-in program 24*b*. However, the technique for uploading the scan content to the web server 32 varies by type of the web browser program 24*a*, and accordingly the technique for uploading the scan content to the web server 32 will be explained for each type of the web browser program 24*a*.

First, there will be explained the case where the web browser program 24*a* is Firefox® which is a registered trademark of Mozilla Foundation. When Firefox is activated or started on the PC 10, the CPU 12 determines whether the click operation has been performed or not. When the click operation is performed, the CPU 12 executes the plug-in program 24*b*. That is, the plug-in program 24*b* is executed as a sub-routine of the web browser program 24*a*. It is noted that the web browser program 24*a* is in a standby state during execution of processings according to the plug-in program 24*b*.

When the plug-in program 24*b* is executed, the CPU 12 determines whether the detected click operation is an operation performed on the browse button 54 (as one example of an instruction for the information processing apparatus) or not. When the detected click operation is an operation performed on the browse button 54, the CPU 12 determines whether the click operation is right-click or left-click. When the detected click operation is right-click (as another example of the instruction for the information processing apparatus and as one example of the instruction for determining the first content as a content to be transmitted to a web server), a command for transmitting the scan instruction to the scanner 30 is transmitted to the scan driver program 24*c*. When having received the command for transmitting the scan instruction to the scanner 30, the scan driver program 24*c* transmits a scan instruction to the scanner 30. When having received the scan instruction, the scanner 30 executes the scan processing and transmits scan data created in the scan processing, to the PC 10. This scan data is acquired by the scan driver program 24*c* and output from the scan driver program 24*c* to the plug-in program 24*b*.

When having received the scan data from the scan driver program 24*c*, the plug-in program 24*b* stores the received scan data into a set particular folder as the scan content. The plug-in program 24*b* outputs, to the web browser program 24*a*, a file path (as one example of first content location information) for the scan content stored in the folder. Then, a notification indication completion of a series of processings executed by the plug-in program 24*b* (noted that this notification may be hereinafter referred to as "completion notification") is output to the web browser program 24*a*. As a result, the standby state of the web browser program 24*a* is canceled or released.

It is noted that when it is determined that the detected click operation is right-click during execution of the plug-in program 24*b*, a display disallowing command is output to the web browser program 24*a*. This display disallowing command is a command for disallowing display of the content selection screen 58 on the panel 18 during the execution of the web browser program 24*a*. In the case where this display disallowing command is detected during the execution of the web browser program 24*a*, the content selection screen 58 is not displayed on the panel 18 even when the browse button 54 is left-clicked.

When the standby state of the web browser program 24*a* is canceled, the web browser program 24*a* determines whether the display disallowing command has been output or not. When the display disallowing command is output, the panel 18 displays the upload screen 50. That is, when the browse button 54 is right-clicked, the panel 18 displays the upload screen 50. At this time, the file path for the scan content which is output by the execution of the plug-in program 24*b* is displayed in the file-path display field 52 on the upload screen 50. That is, the scan content is in its selected state, and when the determination button 68 is left-clicked by the user on the upload screen 50, the scan content is transmitted to the web server 32.

As thus described, the scan content is selected on the PC 10 only by the right-click of the user on the browse button 54. This configuration simplifies the operation for uploading the scan content to the web server 32, thereby increasing operability in the upload operation. Also, in the PC 10, the web browser program 24*a* has the function for executing the plug-in program 24*b* to cause the scanner 30 to execute the scan processing and upload the scan data created in the scan processing to the web server 32. This configuration allows easy upload of the scan content to the web server 32 using the conventional web browser program, thereby reducing efforts required for development of the program.

It is noted that when it is determined that the detected click operation is not an operation performed on the browse button 54 or when the detected click operation is an operation performed on the browse button 54 but this click operation is left-click, the command for transmitting the scan instruction to the scanner 30 is not transmitted, the display disallowing command is not output, and the completion notification is output. As a result, the standby state of the web browser program 24*a* is canceled, and processings of the web browser program 24*a* are executed. In this case, when the browse button 54 displayed on the upload screen 50 is left-clicked (noted that this left click is another example of the instruction for the information processing apparatus and one example of an instruction for determining the second content as the content to be transmitted to the web server), the panel 18 displays the content selection screen 58, and the user can select a desired one of the contents (as another example of the second content) stored in each of the folders created in the data storage area 26.

There will be next explained the case where the web browser program 24*a* is Google Chrome® which is a registered trademark of Google Inc. When Google Chrome is activated on the PC 10, the CPU 12 determines whether the browse button 54 on the upload screen 50 has been clicked or not. When the CPU 12 determines that the browse button 54 is clicked, the CPU 12 outputs information indicating that the browse button 54 is clicked (hereinafter may be referred to as "operation information").

It is noted that in the case where the web browser program 24*a* is Google Chrome, the plug-in program 24*b* is executed with the execution of the web browser program 24*a* to execute processings relating to the operation information which is output by the execution of the web browser program 24*a*. That is, the plug-in program 24*b* is executed as a sub-thread of the web browser program 24*a*. It is noted that while the processings of the plug-in program 24*b* are being executed, the web browser program 24*a* is in the standby state.

According to the plug-in program 24*b* executed by the execution of the web browser program 24*a*, the CPU 12 determines whether the operation information has been output or not. When the operation information is output, the CPU 12 determines whether the click operation based on which the operation information has been created is right-click or not. When the click operation based on which the operation information has been created is right-click, the command for transmitting the scan instruction to the scanner 30 is transmitted to the scan driver program 24*c*. When having received the command for transmitting the scan instruction to the scanner 30, the scan driver program 24*c* transmits a scan instruction to the scanner 30. When having received the scan instruction, the scanner 30 executes the scan processing and transmits the scan data created in the scan processing, to the PC 10. This scan data is acquired by the scan driver program 24*c* and output from the scan driver program 24*c* to the plug-in program 24*b*.

The plug-in program 24*b* stores the scan data received from the scan driver program 24*c*, into the set particular folder as the scan content. The file path for the scan content stored in the folder is output to the web browser program 24*a*. The completion notification is then output to the web browser program 24*a*, so that the standby state of the web browser program 24*a* is canceled.

It is noted that when the standby state of the web browser program 24*a* is canceled, as in the case where the web browser program 24*a* is Firefox, the CPU 12 determines whether the display disallowing command has been output or not, and when the display disallowing command is output, the panel 18 displays the upload screen 50 on which the scan content is in the selected state. Accordingly, also in the case where the web browser program 24*a* is Google Chrome, it is possible to obtain effects obtained in the case where the web browser program 24*a* is Firefox.

Control Program

Figure 4:
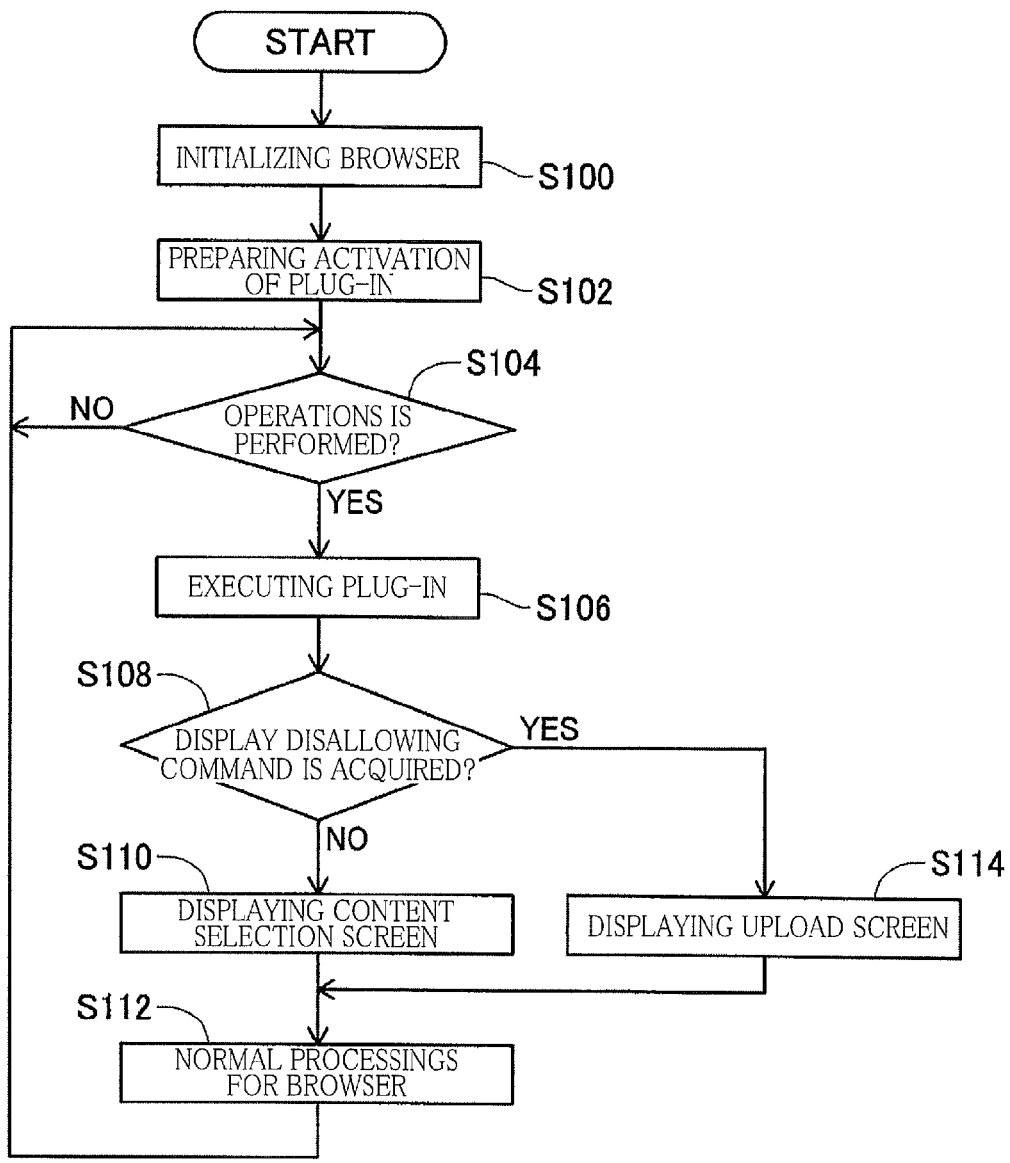
FIG. 4 is a flow chart illustrating processings executed by a personal computer (PC)
Figure 5:
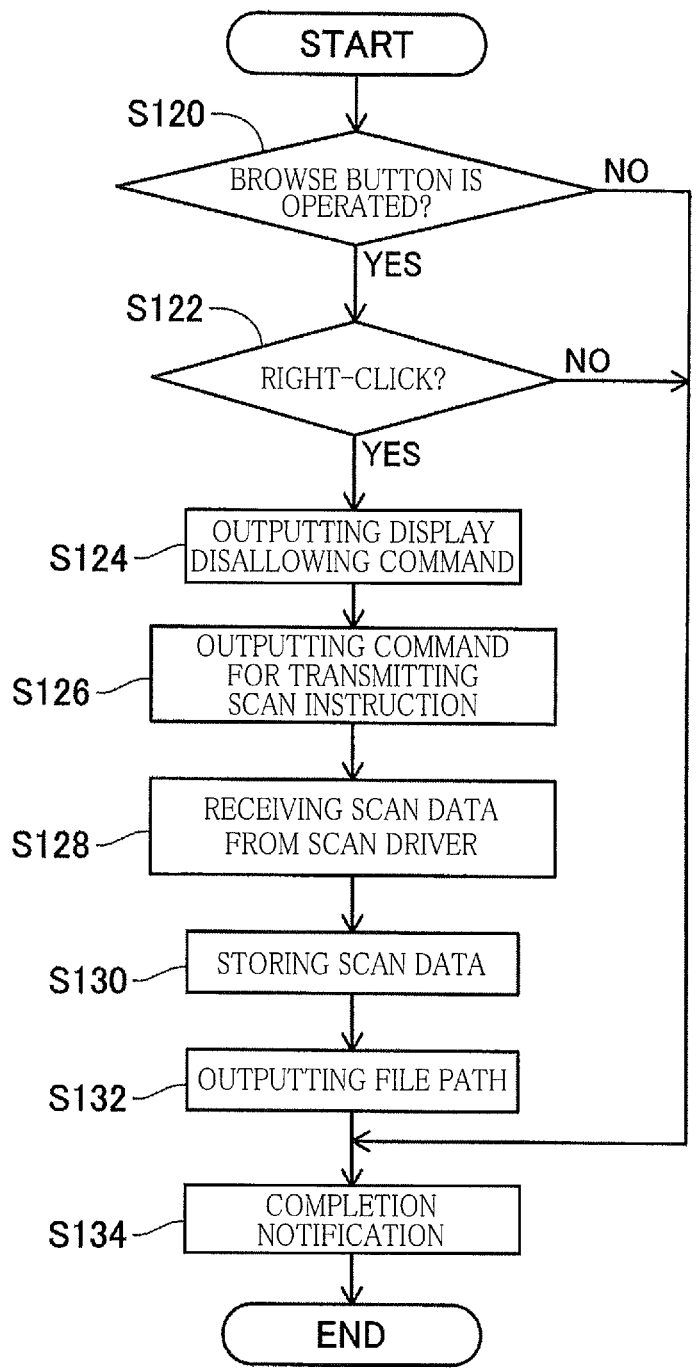
FIG. 5 is a flow chart illustrating processings executed by the PC.
Figure 6:
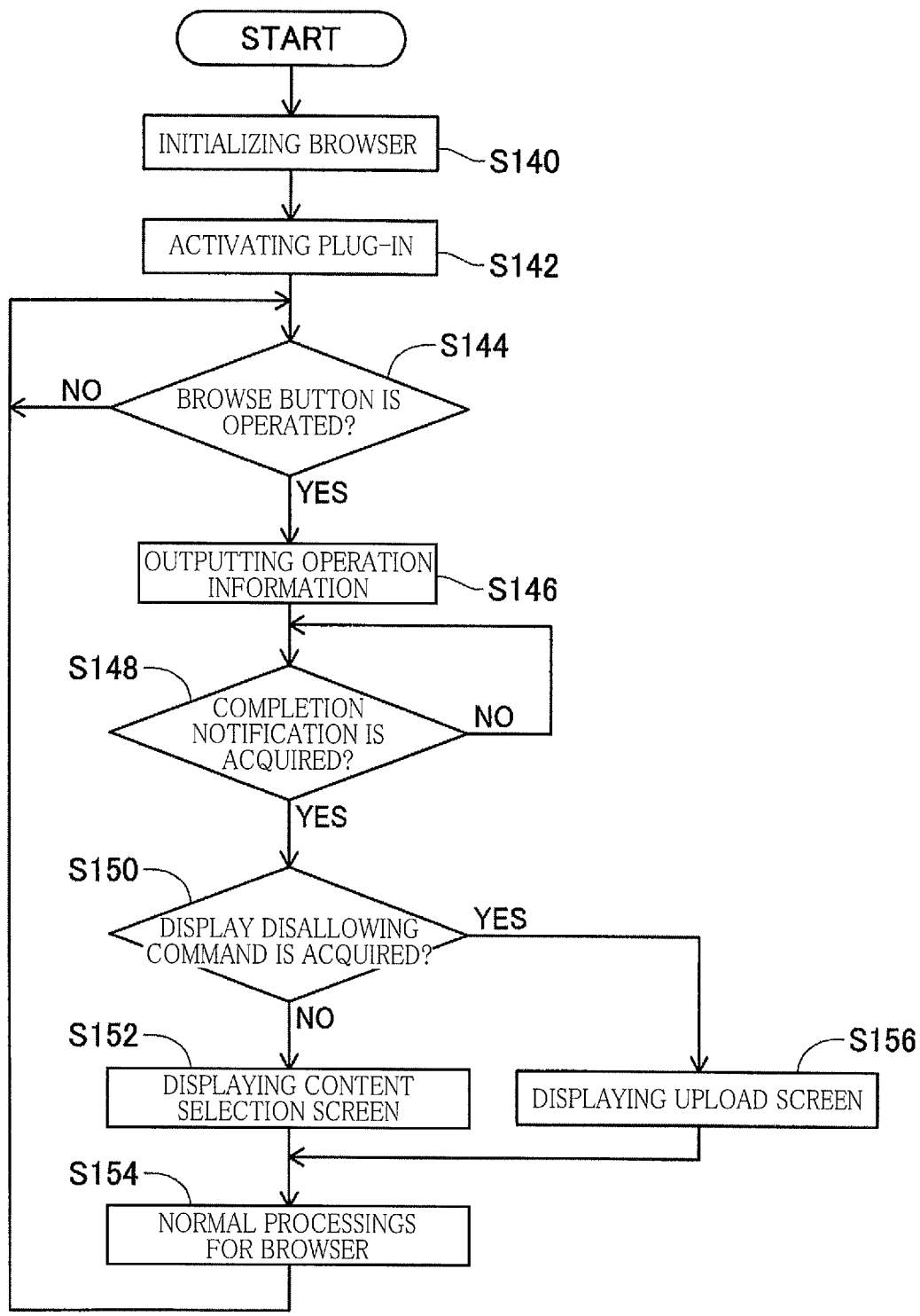
FIG. 6 is a flow chart illustrating processings executed by the PC.
Figure 7:
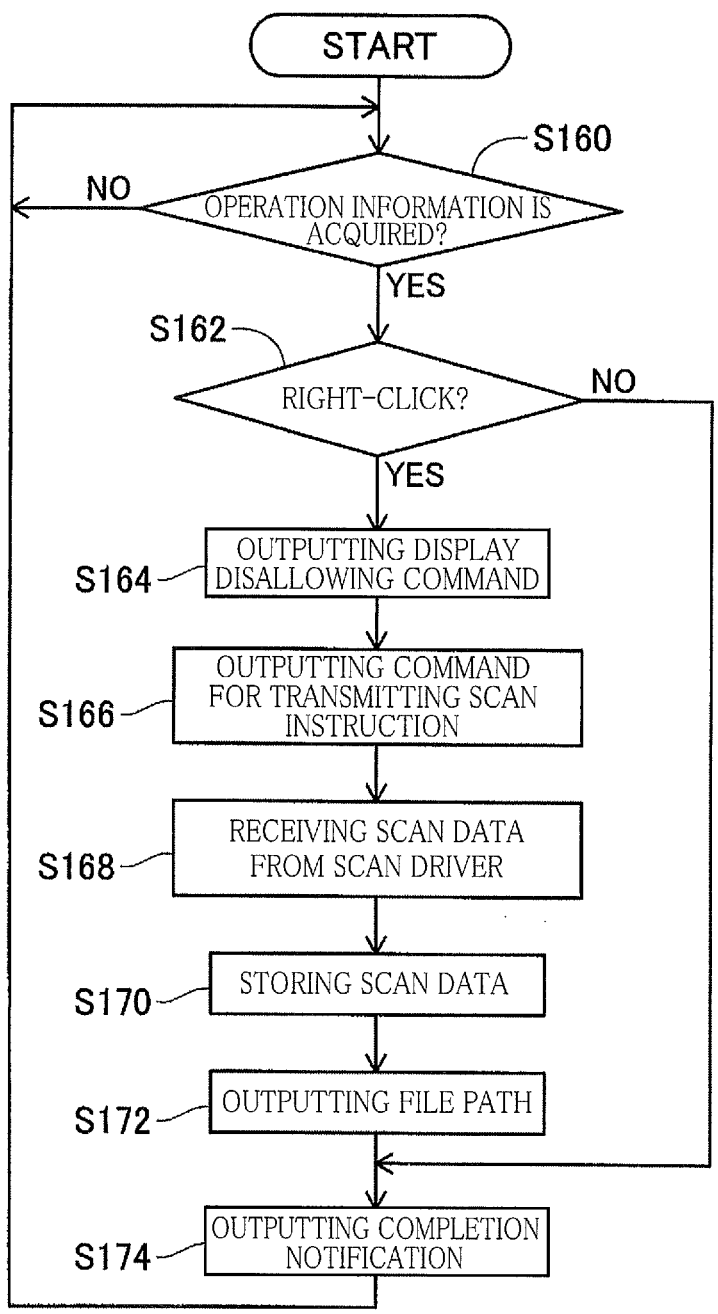
FIG. 7 is a flow chart illustrating processings executed by the PC.

The upload of the content to the web server 32 in the communication system 1 is executed according to the web browser program 24*a* and the plug-in program 24*b* executed by the CPU 12. There will be next explained processings executed by the CPU 12 with reference to FIGS. 4-7. FIG. 4 illustrates a flow of processings executed by the CPU 12 according to the web browser program 24*a* in the case where the web browser program 24*a* is Firefox. FIG. 5 illustrates a flow of processings executed by the CPU 12 according to the plug-in program 24*b* in the case where the web browser program 24*a* is Firefox. FIG. 6 illustrates a flow of processings executed by the CPU 12 according to the web browser program 24*a* in the case where the web browser program 24*a* is Google Chrome. FIG. 7 illustrates a flow of processings executed by the CPU 12 according to the plug-in program 24*b* in the case where the web browser program 24*a* is Google Chrome.

In the case where the web browser program 24*a* is Firefox, when the web browser program 24*a* is executed, the flow illustrated in FIG. 4 begins with S100 at which the browser is initialized. The CPU 12 at S102 prepares activation of the plug-in program 24*b*. The CPU 12 at S104 determines whether the click operation has been performed or not. When the click operation is not performed (S104: NO), the CPU 12 repeats the processing at S104. When the click operation is performed (S104: YES), the CPU 12 at S106 executes processings according to the plug-in program 24*b*. That is, the CPU 12 activates the plug-in program 24*b*.

When the plug-in program 24*b* is activated, as illustrated in FIG. 5, the plug-in program 24*b* at S120 determines whether the detected click operation is an operation performed on the browse button 54 or not. When the detected click operation is an operation performed on the browse button 54 (S120: YES), the plug-in program 24*b* at S122 determines whether the click operation is right-click or not. When the click operation is right-click (S122: YES), the plug-in program 24*b* at S124 outputs the display disallowing command.

The plug-in program 24*b* at S126 outputs the command for transmitting the scan instruction to the scanner 30, to the scan driver program 24*c*. In response, the scan driver program 24*c* transmits a scan instruction to the scanner 30 and receives scan data from the scanner 30 as a response to the scan instruction. The scan driver outputs the obtained scan data to the plug-in program 24*b*. The plug-in program 24*b* at S128 acquires the scan data from the scan driver program 24*c*. When having received the scan data, the plug-in program 24*b* at S130 stores the received scan data into the set particular folder as the scan content. The plug-in program 24*b* at S132 outputs the file path (as another example of the first content location information) for the scan content stored in the folder, to the web browser program 24*a*. When having output the file path, the plug-in program 24*b* at S134 outputs the completion notification to the web browser program 24*a*, and the execution of the plug-in program 24*b* is finished. It is noted that also when the plug-in program 24*b* at S120 determines that the detected click operation is not an operation performed on the browse button 54 (S120: NO) or when the plug-in program 24*b* at S122 determines that the click operation is left-click (S122: NO), the plug-in program 24*b* at S134 outputs the completion notification, and the execution of the plug-in program 24*b* is finished.

When the execution of the plug-in program 24*b* is finished, as illustrated in FIG. 4, the CPU 12 at S108 determines, according to the web browser program 24*a*, whether the display disallowing command has been acquired or not. When the display disallowing command is not acquired, the CPU 12 at S110 controls the panel 18 to display the content selection screen 58. When the display disallowing command is acquired, the CPU 12 at S114 controls the panel 18 to display the upload screen 50. It is noted that when the upload screen 50 is displayed at S114, the file path for the scan content is displayed in the file-path display field 52 on the upload screen 50. When the upload screen 50 or the content selection screen 58 is displayed on the panel 18, the CPU 12 at S112 executes normal processings according to the web browser program 24a, this flow returns to S104.

In the case where the web browser program 24a is Google Chrome, when the web browser program 24a is executed, the flow illustrated in FIG. 6 begins with S140 at which the browser is initialized. The plug-in program 24b is activated at S142. The CPU 12 at S144 determines whether the browse button 54 has been clicked or not. When the click operation is not performed on the browse button 54 (S144: NO), the CPU 12 repeats the processing at S144. When the click operation is performed on the browse button 54 (S144: YES), the PC 10 at S146 outputs the operation information to the plug-in program 24b.

The CPU 12 at S148 determines whether the completion notification has been acquired or not. When the completion notification is not acquired (S148: NO), the CPU 12 repeats the processing at S148. That is, the web browser program 24a is switched to the standby state. When the completion notification is acquired (S148: YES), that is, when the standby state is canceled, the CPU 12 at S150 determines whether the display disallowing command has been acquired or not. When the display disallowing command is not acquired, the CPU 12 at S152 controls the panel 18 to display the content selection screen 58. When the display disallowing command is acquired, the CPU 12 at S156 controls the panel 18 to display the upload screen 50. It is noted that when the upload screen 50 is displayed at S156, the file path for the scan content is displayed in the file-path display field 52 on the upload screen 50. When the upload screen 50 or the content selection screen 58 is displayed on the panel 18, the CPU 12 at S154 executes normal processings according to the web browser program 24a, this flow returns to S144.

According to the plug-in program 24b activated by the processing at S142 in the web browser program 24a, as illustrated in FIG. 7, the CPU 12 at S160 determines whether the operation information has been acquired or not. When the operation information is acquired (S160: YES), the CPU 12 at S162 determines whether the click operation based on which the operation information has been created is right-click or not. When the click operation is right-click (S162: YES), the CPU 12 executes processings at S164 and subsequent steps, but the processings at S164-S172 are the same as the above-described processings at S124-S132, and an explanation of which is dispensed with. Upon completion of the processing at S172, the PC 10 at S174 outputs the completion notification. It is noted that when the operation information is not acquired at S160 (S160: NO), the CPU 12 repeats the processing at S160. When the click operation is left-click at S162 (S162: NO), the plug-in program 24b at S174 outputs the completion notification. When the completion notification is output, this flow returns to S160.

Second Embodiment

In the first embodiment, when the browse button 54 is left-clicked, the upload processing for uploading the stored content to the web server 32 is executed, and when the browse button 54 is right-clicked, the upload processing for uploading the scan content to the web server 32 is executed. In a second embodiment, a scan button and a file button are displayed on the panel 18, an upload processing for each of the stored content and the scan content is executed in response to a click operation (another example of the instruction for the information processing apparatus) on a corresponding one of the scan button and the file button. The upload processing of the content in the communication system 1 in the second embodiment will be explained below. It is noted that the same component as used in the first embodiment are used in this second embodiment, and illustrations and an explanation of which are dispensed with.

Figure 8:
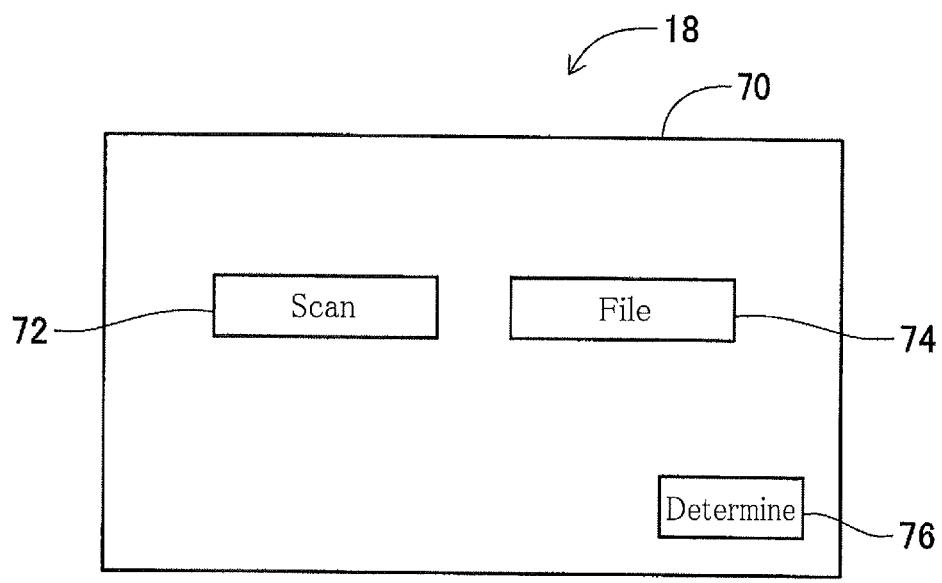
FIG. 8 is a view illustrating a processing selection screen in a second embodiment.

Also in this second embodiment, the panel 18 displays the upload screen 50 according to the web browser program 24a. When the browse button 54 displayed on the upload screen 50 is left-clicked, as illustrated in FIG. 8, a processing selection screen 70 as one example of a first screen is displayed on the panel 18 instead of the upload screen 50. The processing selection screen 70 contains a scan button 72 (as one example of first content selection information), a file button 74 (as one example of second content selection information and as another example of the second content location information), and a determination button 76.

The file button 74 is a button for the user to select a processing for uploading the stored content to the web server 32. The determination button 76 is a button for executing a processing related to the selected button. Accordingly, when the determination button 76 is left-clicked after the file button 74 is left-clicked (noted that this left-click is another example of the instruction for the information processing apparatus and another example of the instruction for determining the second content as the content to be transmitted to the web server), the CPU 12 executes processings similar to the processings executed when the browse button 54 is left-clicked in the first embodiment. That is, when the file button 74 and the determination button 76 are left-clicked, the panel 18 displays the content selection screen 58 instead of the processing selection screen 70. When the determination button 68 on the content selection screen 58 is thereafter left-clicked by the user in the state in which a content stored in the folder is selected, a file path for the selected stored content is displayed in the file-path display field 52 on the upload screen 50. As thus described, when the file button 74 and the determination button 76 are left-clicked on the processing selection screen 70, and the above-described user operation is performed, the stored content is switched to the selected state.

The scan button 72 is a button for the user to select a processing for uploading the scan content to the web server 32. Accordingly, when the determination button 76 is left-clicked after the scan button 72 is left-clicked (noted that this left-click is another example of the instruction for the information processing apparatus and as another example of the instruction for determining the first content as the content to be transmitted to the web server), the CPU 12 executes processings similar to those executed in the case where the browse button 54 is right-clicked in the first embodiment. That is, when the scan button 72 and the determination button 76 are left-clicked, the PC 10 sends the scan driver program 24c the command for transmitting the scan instruction to the scanner 30. When having received the command for transmitting the scan instruction to the scanner 30, the scan driver program 24c transmits a scan instruction to the scanner 30. When having received the scan instruction, the scanner 30 executes a scan processing and sends the PC 10 scan data created in the scan processing. This scan data is acquired by the scan driver program 24c and output from the scan driver program 24c to the plug-in program 24b. When having received the scan data from the scan driver program 24c, the plug-in program 24b stores the received scan data into the set particular folder as the scan content. A file path for the scan content stored in the folder is then transmitted to the web browser program 24*a*. As a result, the file path for the scan content is displayed in the file-path display field 52 on the upload screen 50. As thus described, when the scan button 72 and the determination button 76 are left-clicked on the processing selection screen 70, the scan content is switched to the selected state.

In the second embodiment as described above, the scan content can be uploaded to the web server 32 with a very small number of user operations, resulting in increase in operability in the upload operation. Also, in the second embodiment, as in the first embodiment, the above-described processings are executed by the execution of the web browser program 24*a*, the plug-in program 24*b*, and the scan driver program 24*c*. There will be explained, with reference to FIG. 9, a flow of processings executed by the CPU 12 according to the plug-in program 24*b* in the case where the web browser program 24*a* is Firefox. It is noted that the same flow as illustrated in FIG. 4 is executed in the flow executed by the CPU 12 according to the web browser program 24*a* in the case where the web browser program 24*a* is Firefox, and an explanation of which is dispensed with. Also, there will be explained, with reference to FIG. 10, a flow of processings executed by the CPU 12 according to the plug-in program 24*b* in the case where the web browser program 24*a* is Google Chrome. It is noted that the same flow as illustrated in FIG. 6 is executed in the flow executed by the CPU 12 according to the web browser program 24*a* in the case where the web browser program 24*a* is Google Chrome, and an explanation of which is dispensed with.

Figure 9:
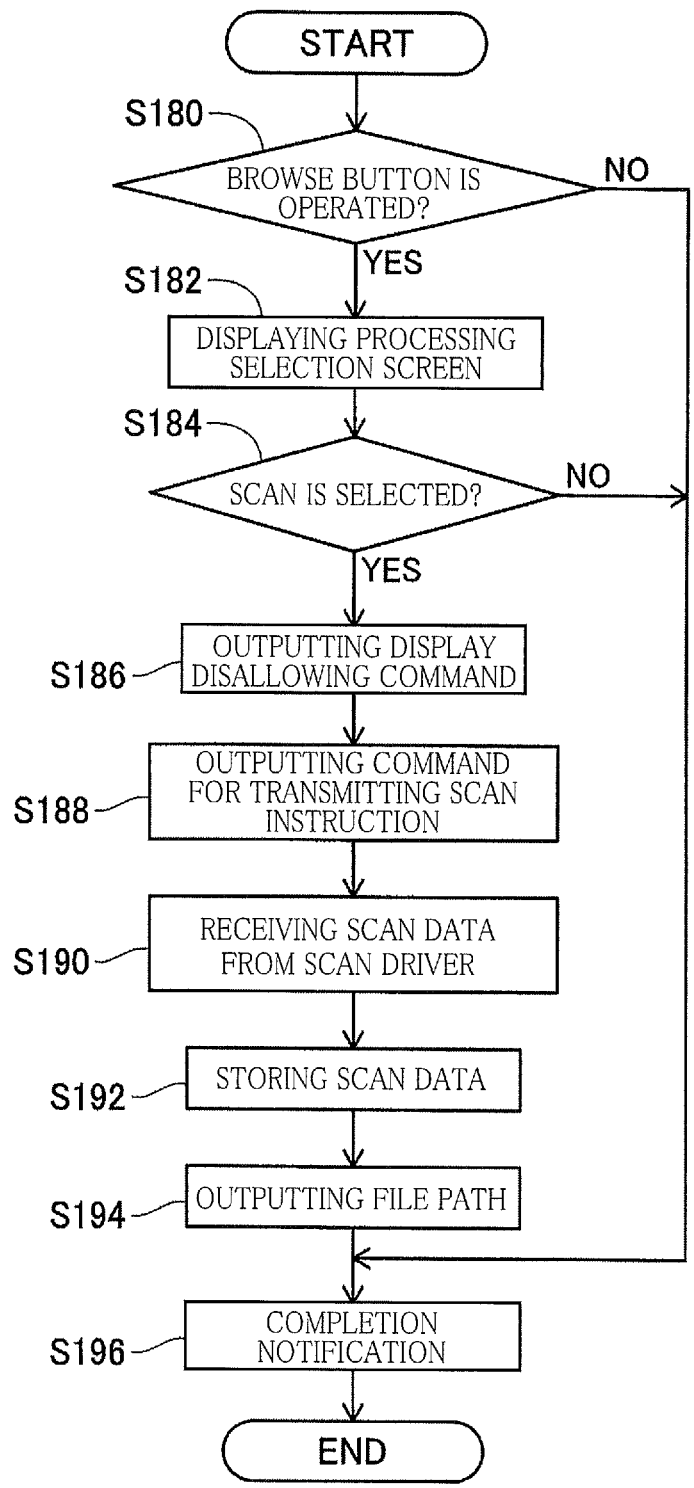
FIG. 9 is a flow chart illustrating processings executed by a PC according to the second embodiment.

In the case where the web browser program 24*a* is Firefox, when the processing at S106 in FIG. 4 is executed according to the web browser program 24*a*, the plug-in program 24*b* is executed, and as illustrated in FIG. 9 the CPU 12 at S180 determines whether the click operation detected by the execution of the web browser program 24*a* is left-click on the browse button 54 or not. When the click operation detected by the execution of the web browser program 24*a* is left-click on the browse button 54 (S180: YES), the CPU 12 at S182 controls the panel 18 to display the processing selection screen 70.

The CPU 12 at S184 determines whether the scan button 72 has been operated on the processing selection screen 70 or not. When the scan button 72 is operated (S184: YES), the CPU 12 executes processings at S186 and subsequent steps, but the processings at S186-S196 are the same as the above-described processings at S124-S134, and an explanation of which is dispensed with. Upon completion of the processing at S196, the processings of the plug-in program 24*b* are finished, and the web browser program 24*a* executes the processings at S108 and subsequent steps in FIG. 4. It is noted that also when the click operation is not left-click on the browse button 54 at S180 (S180: NO) or when the file button 74 is operated at S184 (S184: NO), the completion notification is output at S196, and the processings of the plug-in program 24*b* are finished. The web browser program 24*a* then executes the processings at S108 and subsequent steps in FIG. 4.

Figure 10:
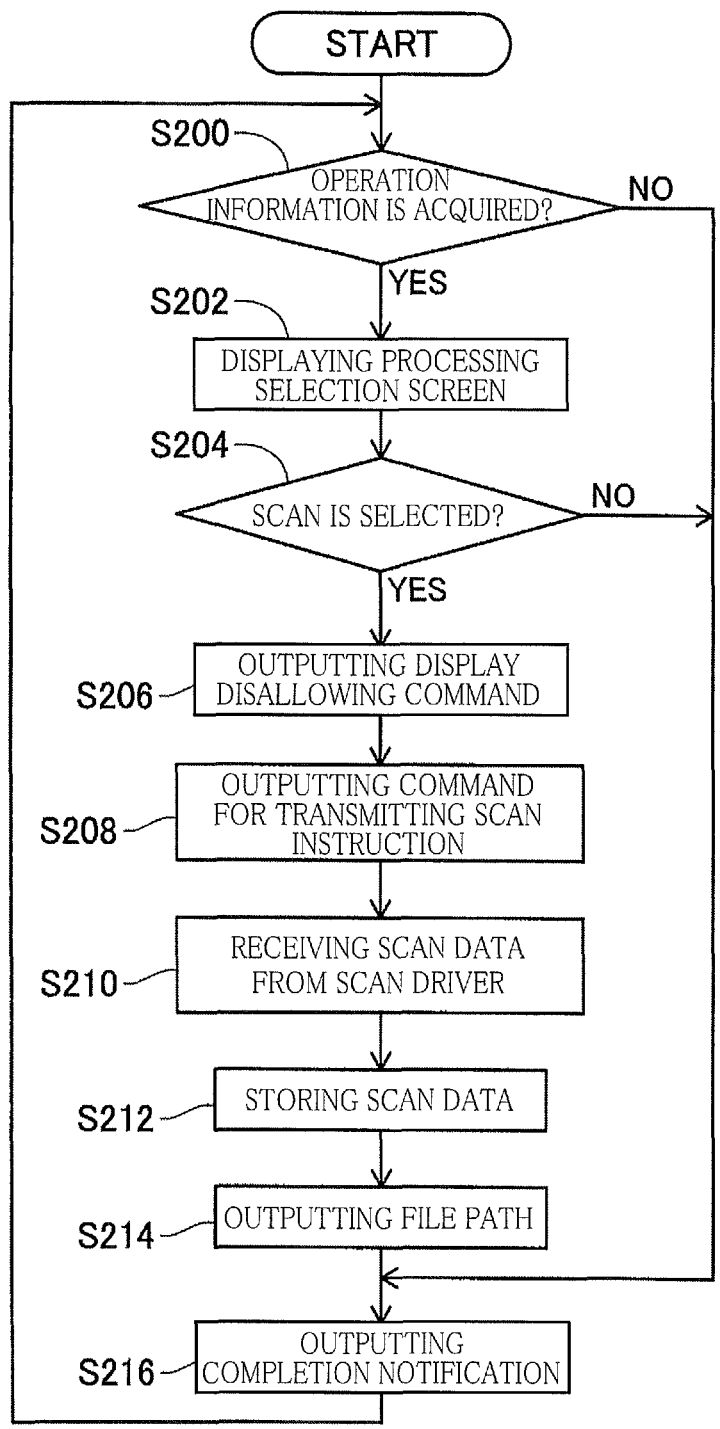
FIG. 10 is a flow chart illustrating processings executed by the PC according to the second embodiment.

In the case where the web browser program 24*a* is Google Chrome, when the processing at S142 in FIG. 6 is executed according to the web browser program 24*a*, the plug-in program 24*b* is executed, and as illustrated in FIG. 10 the CPU 12 at S200 determines whether operation information created by the execution of the web browser program 24*a* has been acquired or not. When the operation information is acquired (S200: YES), the CPU 12 at S202 controls the panel 18 to display the processing selection screen 70.

The CPU 12 at S204 determines whether the scan button 72 has been operated on the processing selection screen 70 or not. When the scan button 72 is operated (S204: YES), the CPU 12 executes processings at S206 and subsequent steps, but the processings at S206-S214 are the same as the above-described processings at S164-S172, and an explanation of which is dispensed with. Upon completion of the processing at S214, the CPU 12 at S216 outputs the completion notification, and this flow returns to S200. It is noted that also when the operation information is not acquired at S200 (S200: NO) or the file button 74 is operated at S204 (S204: NO), the CPU 12 at S216 outputs the completion notification, and this flow returns to S200.

In the second embodiment as described above, as in the first embodiment, the scan content can be uploaded to the web server 32 using the conventional web browser program, thereby reducing efforts required for development of the program.

Third Embodiment

In the first embodiment and the second embodiment, the content selection screen 58 for selecting the stored content is displayed on the panel 18 by the execution of the web browser program 24*a*. In the third embodiment, a content selection screen for selecting the stored content is displayed on the panel 18 by execution of the plug-in program 24*b*. The upload processing of the content in the communication system 1 in the third embodiment will be explained below. It is noted that the same component as used in the first embodiment are used in this third embodiment, and illustrations and an explanation of which are dispensed with.

Figure 11:
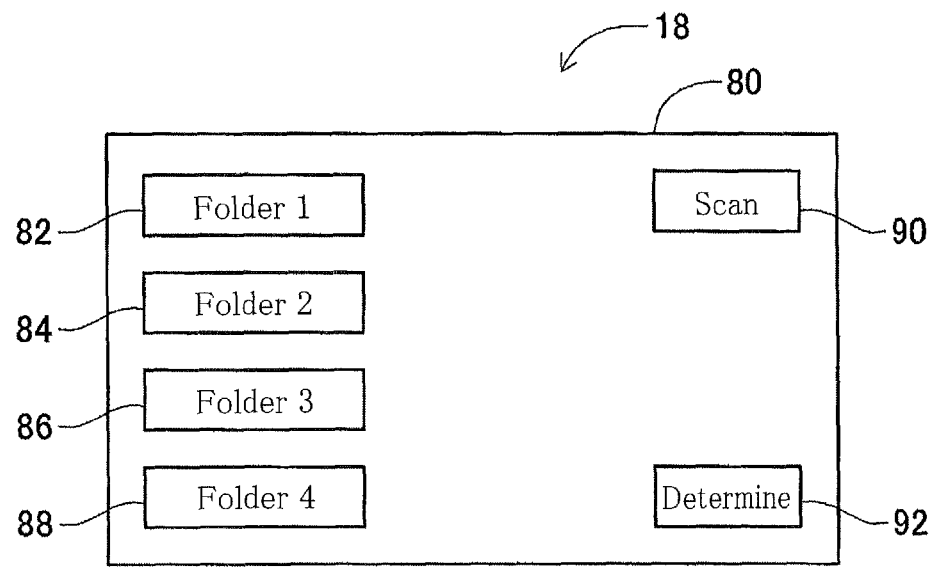
FIG. 11 is a view illustrating a file selection screen in a third embodiment.

Also in this third embodiment, the panel 18 displays the upload screen 50 according to the web browser program 24*a*. When the browse button 54 displayed on the upload screen 50 is left-clicked, as illustrated in FIG. 11, a file selection screen 80 as another example of the first screen is displayed on the panel 18 according to the plug-in program 24*b*. The file selection screen 80 contains a plurality of folder determination buttons 82, 84, 86, 88 (each as another example of the second content selection information and the second content location information), a scan button 90 (as another example of the first content selection information), and a determination button 92.

Each of the folder determination buttons 82, 84, 86, 88 has the same function as that of the folder determination buttons 60, 62, 64, 66 contained in the content selection screen 58 in the first embodiment. The determination button 92 is a button for executing a processing related to the selected button. Accordingly, when the determination button 92 is left-clicked after any one of the folder determination buttons 82, 84, 86, 88 is left-clicked (noted that this left-click is another example of the instruction for the information processing apparatus and another example of the instruction for determining the second content as the content to be transmitted to the web server), the CPU 12 executes processings similar to the processings executed when any one of the folder determination buttons 60, 62, 64, 66 and the determination button 68 are left-clicked on the content selection screen 58 in the first embodiment. That is, when any one of the folder determination buttons 82, 84, 86, 88 and the determination button 92 are left-clicked on the file selection screen 80, contents stored in the clicked one of the folder determination buttons 82, 84, 86, 88 are displayed on the file selection screen 80 on the panel 18, and the user selects a desired one of the stored contents. When the determination button 92 is clicked, a file path (as another example of the second content location information) for the selected stored content is displayed in the file-path display field 52 on the upload screen 50. As thus described, when any one of the folder determination buttons 82, 84, 86, 88 and the determination button 92 are left-clicked on the file selection screen 80, the stored content is switched to the selected state.

The scan button 90 is a button for the user to select a processing for uploading the scan content to the web server 32. Accordingly, when the determination button 92 is left-clicked after the scan button 90 is left-clicked (noted that this left-click is another example of the instruction for the information processing apparatus and another example of the instruction for determining the first content as the content to be transmitted to the web server), the CPU 12 executes processings similar to those executed in the case where the browse button 54 is right-clicked in the first embodiment. That is, the scan button 90 and the determination button 92 are left-clicked, the PC 10 sends the scan driver program 24c the command for transmitting the scan instruction to the scanner 30. When having received the command for transmitting the scan instruction to the scanner 30, the scan driver program 24c transmits a scan instruction to the scanner 30. When having received the scan instruction, the scanner 30 executes a scan processing and sends the PC 10 scan data created in the scan processing. This scan data is acquired by the scan driver program 24c and output from the scan driver program 24c to the plug-in program 24b. When having received the scan data from the scan driver program 24c, the plug-in program 24b stores the received scan data into the set particular folder as the scan content. A file path (as another example of the first content location information) for the scan content stored in the folder is then output to the web browser program 24a. As a result, the file path for the scan content is displayed in the file-path display field 52 on the upload screen 50. As thus described, when the scan button 90 and the determination button 92 are left-clicked on the file selection screen 80, the scan content is switched to the selected state.

In the third embodiment as described above, the scan content can be uploaded to the web server 32 with a very small number of user operations, resulting in increase in operability in the upload operation. Also, in the third embodiment, as in the first embodiment, the above-described processings are executed by the execution of the web browser program 24a, the plug-in program 24b, and the scan driver program 24c. There will be explained, with reference to FIG. 12, a flow of processings executed by the CPU 12 according to the plug-in program 24b in the case where the web browser program 24a is Firefox. It is noted that the same flow as illustrated in FIG. 4 is executed in the flow executed by the CPU 12 according to the web browser program 24a in the case where the web browser program 24a is Firefox, and an explanation of which is dispensed with. Also, there will be explained, with reference to FIG. 13, a flow of processings executed by the CPU 12 according to the plug-in program 24b in the case where the web browser program 24a is Google Chrome. It is noted that the same flow as illustrated in FIG. 6 is executed in the flow executed by the CPU 12 according to the web browser program 24a in the case where the web browser program 24a is Google Chrome, and an explanation of which is dispensed with.

Figure 12:
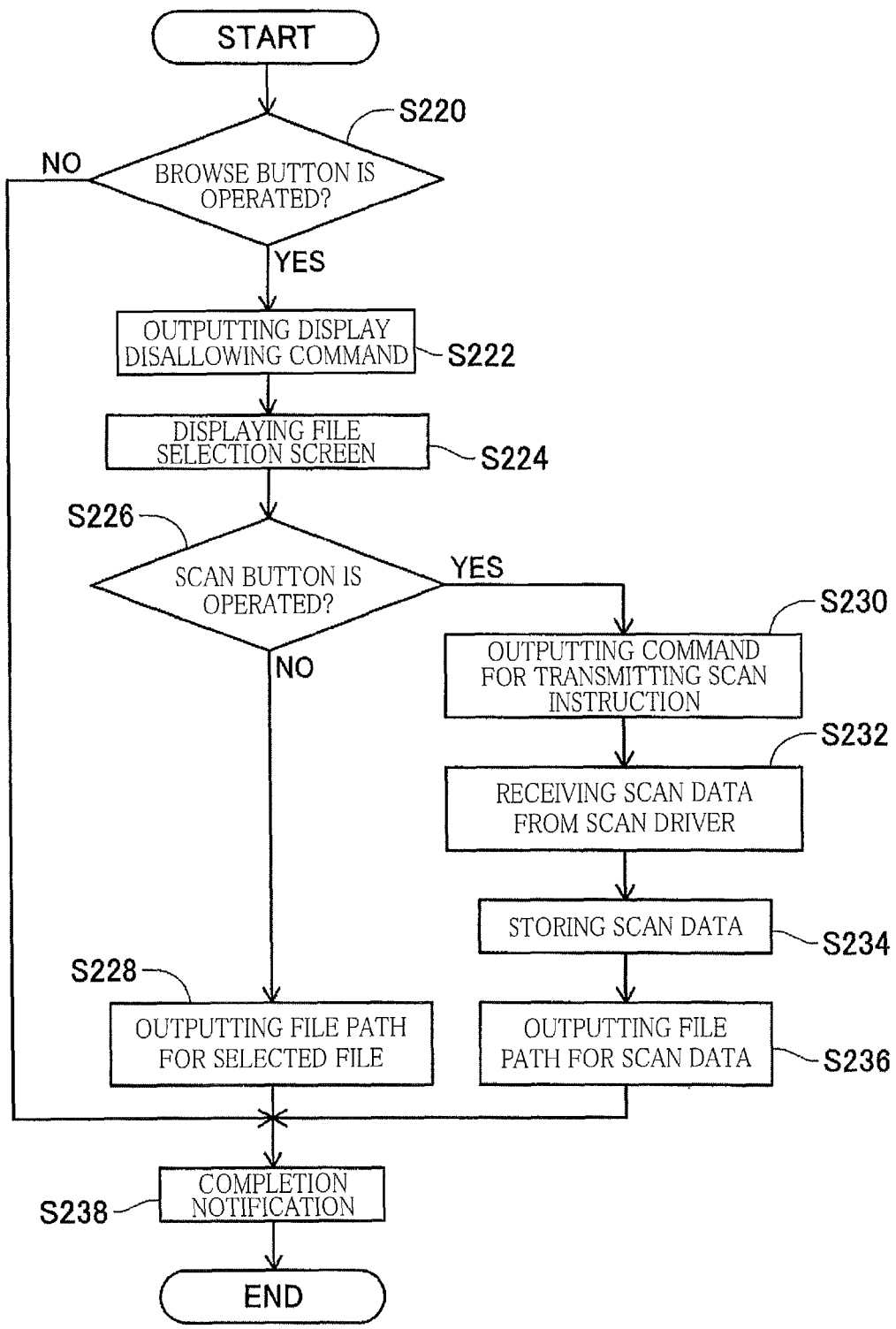
FIG. 12 is a flow chart illustrating processings executed by a PC according to the third embodiment.

In the case where the web browser program 24a is Firefox, when the processing at S106 in FIG. 4 is executed according to the web browser program 24a, the plug-in program 24b is executed, and as illustrated in FIG. 12 the CPU 12 at S220 determines whether the click operation detected by the execution of the web browser program 24a is left-click on the browse button 54 or not. When the click operation detected by the execution of the web browser program 24a is left-click on the browse button 54 (S220: YES), the CPU 12 at S222 outputs the display disallowing command. The CPU 12 at S224 controls the panel 18 to display the file selection screen 80.

The CPU 12 at S226 determines whether the scan button 90 has been operated on the file selection screen 80 or not. When the scan button 90 is operated (S226: YES), the CPU 12 executes processings at S230 and subsequent steps, but the processings at S230-S238 are the same as the above-described processings at S126-S134, and an explanation of which is dispensed with. Upon completion of the processing at S236, the processings of the plug-in program 24b are finished, and the web browser program 24a executes the processings at S108 and subsequent steps in FIG. 4.

When any of the folder determination buttons 82, 84, 86, 88 is operated (S226: NO), the CPU 12 at S228 outputs a file path (as another example of the second content location information) for a content selected from among contents stored in a folder corresponding to the operated button. The completion notification is output at S238, and the processings of the plug-in program 24b are finished. The web browser program 24a then executes the processings at S108 and subsequent steps in FIG. 4.

Figure 13:
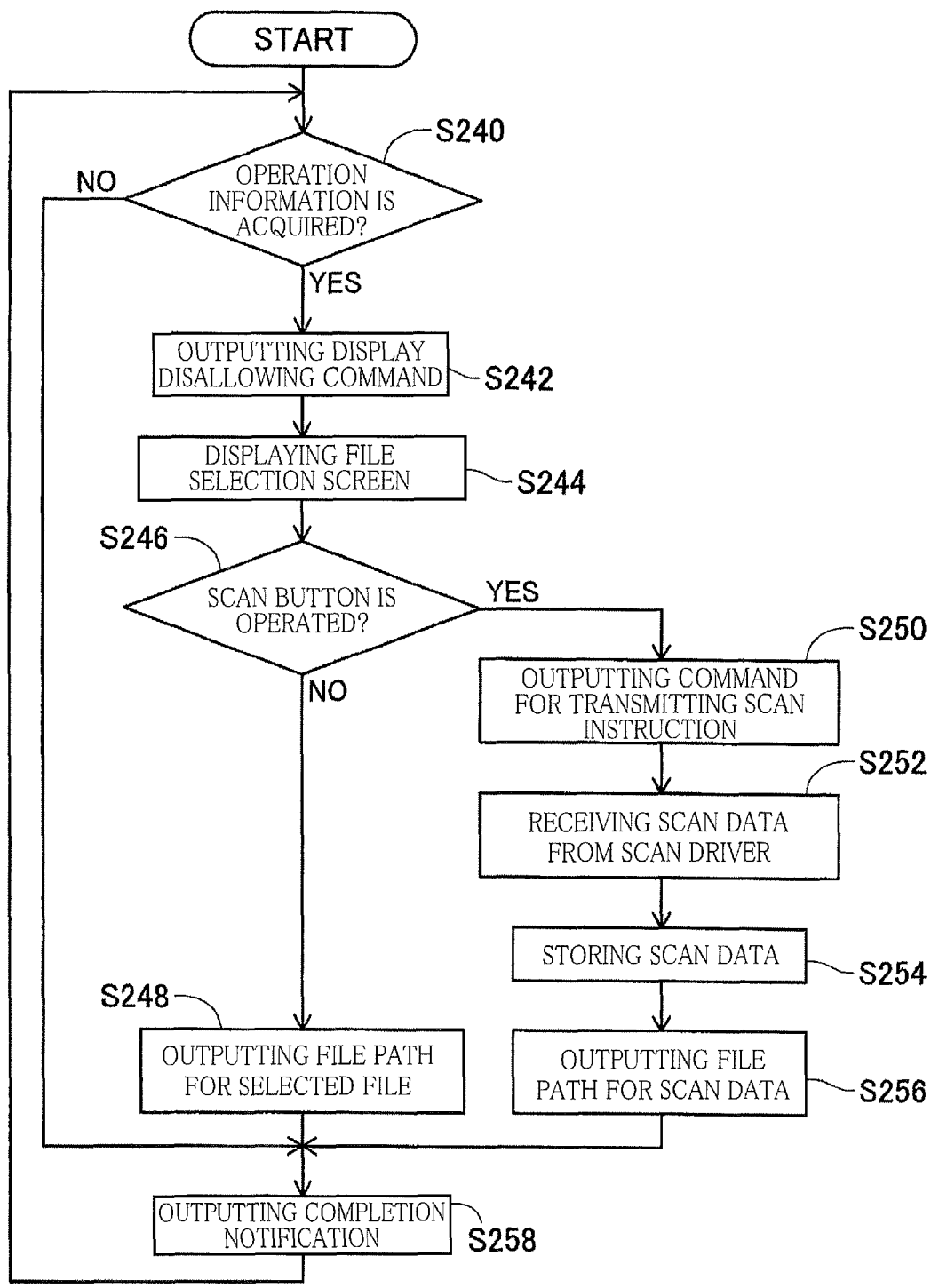
FIG. 13 is a flow chart illustrating processings executed by the PC according to the third embodiment.

In the case where the web browser program 24a is Google Chrome, when the processing at S142 in FIG. 6 is executed according to the web browser program 24a, the plug-in program 24b is executed, and as illustrated in FIG. 13 the CPU 12 at S240 determines whether operation information created by the execution of the web browser program 24a has been acquired or not. When the operation information created by the execution of the web browser program 24a is acquired (S240: YES), the CPU 12 executes processings at S242 and subsequent steps, but the processings at S242-S256 are the same as the above-described processings at S222-S236, and an explanation of which is dispensed with. Upon completion of the processing at S256, the CPU 12 at S258 outputs the completion notification, and this flow returns to S240. It is noted that also when the operation information is not acquired at S240 (S240: NO), the CPU 12 at S258 outputs the completion notification, and this flow returns to S240.

In the third embodiment as described above, as in the first embodiment, the scan content can be easily uploaded to the web server 32 utilizing the conventional web browser program, thereby reducing efforts required for development of the program.

Functional Configuration of CPU

In view of the processings executed by the CPU 12 of the CPU 10, the CPU 12 which executes the above-described processings can be considered to have a functional configuration illustrated in FIG. 1. As illustrated in FIG. 1, the CPU 12 includes an acquirer 100, a determiner 102, a completion information outputter 104, a scan data acquirer 106, a first identification information outputter 108, a display controller 110, a disallowing instruction outputter 112, and a second identification information outputter 114. The instruction acquisition processing is a functional portion of the CPU12 which executes the processings at S120, S160, S180, S200, S220, and S240. The determination processing is a functional portion of the CPU12 which executes the processings at S122, S162, S184, S204, S226, and S246. The completion information outputter 104 is a functional portion of the CPU12 which executes the processings at S134, S174, S196, S216, S238, and S258. The content acquisition processing is a functional portion of the CPU12 which executes the processings at S128, S168, S190, S210, S232, and S252. A first-content location informationcontent-location-information output processing is a functional portion of the CPU12 which executes the processings at S132, S172, S194, S214, S236, and S256. A display processing is a functional portion of the CPU12 which executes the processings at S182, S202, S224, and S244. A disallowing-instruction output processing is a functional portion of the CPU12 which executes the processings at S124, S164, S186, S206, S222, and S242. A second-content location informationcontent-location-information output processing is a functional portion of the CPU12 which executes the processing at S228 and S248.

While the embodiments have been described above, it is to be understood that the disclosure is not limited to the details of the illustrated embodiments, but may be embodied with various changes and modifications, which may occur to those skilled in the art, without departing from the spirit and scope of the disclosure. Specifically, while the PC 10 is employed as a device configured to execute the upload processing for uploading the data to the web server 32 in the above-described embodiments, a mobile terminal such as a smartphone may be employed, for example. While the mouse 16 is employed as an operation device for various kinds of inputs in the upload processing, a device such as an operation button and a touch panel may be employed. In the case where the touch panel is employed as the operation device, the various kinds of inputs can be performed by a touch operation, a flick operation, and other similar operations on the touch panel.

While Firefox and Google Chrome are used as the web browser program 24a in the above-described embodiments, the present invention may be applied to various kinds of web browser programs.

In the above-described embodiments, the processings illustrated in FIGS. 4-7 are executed by the CPU 12. These processings do not need to be executed by the CPU 12 and may be executed by an ASIC or another or other similar logical integrated circuits and may be executed by cooperation of the CPU, the ASIC, and the logical integrated circuit, for example. Also, the plug-in program 24b may include the scan driver program 24c. In this case, a scan instruction is transmitted to the scanner 30 at S126, S166, S188, S208, S230, and S250. Furthermore, scan data is received from the scanner 30 at S128, S168, S190, S210, S232, and S252.

What is claimed is:

1. A non-transitory storage medium storing a program executable by a processor of an information processing apparatus, the information processing apparatus comprising: a communication device communicable with a reading apparatus; a first storage area configured to store a content; a second storage area configured to store a web browser program; a user interface configured to accept a user operation and provide an input corresponding to the user operation; and a display,
  the web browser program, when executed by the processor, causing the information processing apparatus to execute a web-browser processing in which the information processing apparatus: displays a web screen including a particular icon on the display; and receives an input designating the particular icon as the user operation accepted by the user interface,
  the program, when executed by the processor, causing the information processing apparatus to execute:
    a determination processing in which the information processing apparatus determines, based on the user operation, accepted by the user interface, whether a content to be transmitted to a web server is determined to be one of (i) a first content which is not stored in the first storage area when the user operation is received and (ii) a second content which is stored in the first storage area when the user operation is received;
    a content acquisition processing in which when the content to be transmitted to the web server is determined to be the first content in the determination processing, the information processing apparatus outputs a request for the first content to the reading apparatus and acquires the first content which is created by the reading apparatus as a response to the request for the first content;
    a storing processing in which the information processing apparatus stores the first content acquired in the content acquired processing in the first storage area and
    a file-path output processing in which the information processing apparatus outputs a file path of the first content stored in the first storage area to the web browser program,
  wherein the web browser program display the file path and a upload-executing icon in the web screen in response to receipt of the file path, the up-load executing icon being an icon to which the user operation is input and for which the first content is uploaded to the web server when the user operation to the up-load executing icon is input.

2. The non-transitory storage medium according to claim 1,
  wherein the web-browser executing device is configured to output a particular icon designating information in response to that the input designating the particular icon has received from the user interface, and
  wherein, in the web-browser processing, the information processing apparatus receives the particular icon designating information, and
  wherein in the determination processing, the information processing apparatus determines the content to be transmitted to the web server based on the particular icon designating information.

3. The non-transitory storage medium according to claim 1,
  wherein when executed by the processor, the program causes the information processing apparatus to execute a completion-notification output processing in which when the file path of the first content is output in the file-path output processing, the information processing apparatus outputs a completion notification indicating completion of a processing of the program, and
  wherein, in the web-browser processing, the information apparatus receives the completion notification.

4. The non-transitory storage medium according to claim 3,
  wherein in the web-browser processing, the information processing apparatus stops an execution of the web-browser processing upon receiving the input designating the particular icon from the user interface,
  wherein in the completion-notification output processing, the information processing apparatus outputs the completion notification when the content to be transmitted to the web server is determined to be the second content stored in the first storage in the determination processing or when the file path of the first content is output to the web-browser processing in the file path output processing, and wherein in the web-browser processing, when having received the completion notification output in the completion-notification output processing, the information processing apparatus restarts the execution of the processing of the web-browser processing.

5. The non-transitory storage medium according to claim 1,
wherein the information processing apparatus further comprises a third storage area configured to store a scan driver,
wherein when executed by the processor, the scan driver causes the information processing apparatus to execute a scan-driver processing in which the information processing apparatus:
transmits, via the communication unit to the reading apparatus, a reading request to create reading data; and
receives reading data via the communication unit, and
wherein in the content acquisition processing, when the first content is determined to be transmitted to the web server in the determination processing, the information processing apparatus outputs a request requesting the reading data and acquires the reading data as the first content, the reading data being data which the information apparatus, in the scan-driver processing, has received from the reading apparatus.

6. The non-transitory storage medium according to claim 1,
wherein in the web-browser processing, when the input designating the particular icon is received from the user interface, the information processing apparatus displays a second screen on which the file path of the second content stored in the first storage area is displayed on the web screen,
wherein when executed by the processor, the program causes the information processing apparatus to execute a disallowing-instruction output processing in which when the content to be transmitted to the web server is determined to be the first content in the determination processing, the information processing apparatus outputs an instruction for disallowing display of the second screen, and
wherein, in the web-browser processing, the information apparatus receives the instruction for disallowing display of the second screen.

7. The non-transitory storage medium according to claim 1,
wherein the user interface is configured to accept a first operation and a second operation different from the first operation, such that the first operation and the second operation are distinguished from each other and configured to provide a first input upon accepting the first operation and provide a second input, which is different from the first input, upon accepting the second operation, and
wherein in the determination processing, the information processing apparatus determines the content to be transmitted to the web server, based on whether the input designating the particular icon is the first input or the second input.

8. The non-transitory storage medium according to claim 1,
wherein the program causes the information processing apparatus to:
displays, on the display, a first screen for selection of one of the first content and the second content as the content to be transmitted to the web server, in response to that the information processing apparatus, in the web-browser processing, receives the input designating the particular icon from the user interface; and
receives an input designating one of the first content and the second content from the receiver, and
wherein in the determination processing, the information processing apparatus determines the content to be transmitted to the web server, based on a content selected on the first screen.

9. The non-transitory storage medium according to claim 8, wherein the first screen comprises: a first icon corresponding to the first content; and a second icon corresponding to the second content.

10. The non-transitory storage medium according to claim 9, wherein the second icon indicates information indicating a file path of the second content.

11. The non-transitory storage medium according to claim 9,
wherein when executed by the processor, the program causes the information processing apparatus to execute a completion-notification output processing in which the information processing apparatus outputs a completion notification indicating completion of a processing of the program,
wherein, in the web-browser processing, the information processing apparatus receives the completion notification,
wherein in the determination processing, when an input designating the first icon is received from the user interface, the information processing apparatus determines that the content to be transmitted to the web server is the first content, and when an input designating the second icon is received from the user interface, the information processing apparatus determines that the content to be transmitted to the web server is the second content,
wherein in the completion-notification output processing, when the file path of the first content is output processing or when the file path of the second content is output, the information processing apparatus outputs the completion notification, and
wherein the file path of the second content output is processed in the web-browser processing.

12. The non-transitory storage medium according to claim 11,
wherein in the web-browser processing, when an input designating the particular icon is received from the user interface, the information processing apparatus displays a second screen on which the file path of the second content stored in the first storage is displayed on the web screen,
wherein when executed by the processor, the program causes the information processing apparatus to execute a disallowing-instruction output processing in which the information processing apparatus outputs an instruction for disallowing display of the second screen,
wherein, in the web-browser processing, the information apparatus receives the instruction for disallowing display of the second screen, and
wherein in the disallowing-instruction output processing, the information processing apparatus outputs the instruction for disallowing display of the second screen, prior to an output of the completion notification in the completion-notification output processing.

13. An information processing apparatus, comprising:
a communication device communicable with a reading apparatus;

a first storage area configured to store a content; a second storage area configured to store a web browser program;

a user interface configured to accept a user operation and provide an input corresponding to the user operation;

a display; and a controller, the web browser program, when executed by the controller, causing the information processing apparatus to execute a web-browser processing in which the information processing apparatus: displays a web screen including a particular icon on the display; and receives an input designating the particular icon as the user operation accepted by the user interface, the controller being configured to cause the information processing apparatus to execute:

a determination processing in which the information processing apparatus determines, based on the user operation accepted by the user interface, whether a content to be transmitted to a web server is determined to be one of (i) a first content which is created by the reading apparatus and which is not stored in the first storage area when the user operation is received and (ii) a second content which is stored in the first storage area when the user operation is received;

a content acquisition processing in which when the content to be transmitted to the web server is determined to be the first content in the determination processing, the information processing apparatus outputs a request for the first content to the reading apparatus and acquires the first content which is created by the reading apparatus as a response to the request for the first content;

a storing processing in which the information processing apparatus stores the first content acquired in the content acquired processing in the first storage area; and a file-path output processing in which the information processing apparatus outputs a file path of the first content stored in the first storage area to the web browser program, wherein the web browser program display the file path and a upload-executing icon in the web screen in response to receipt of the file path, and the up-load-executing icon being an icon to which the user operation is input and for which the first content is uploaded to the web server when the user operation to the up-load-executing icon is input.

14. The information processing apparatus according to claim 13, wherein the information processing apparatus further comprises a third storage area configured to store a scan driver, wherein the scan driver causes the information processing apparatus to function as a scan-driver executing device configured to cause the reading apparatus to create reading data, wherein the controller is configured to cause the information processing apparatus to:

display, on the display, a first screen for selection of one of the first content and the second content as the content to be transmitted to the web server, in response to that the information processing apparatus, in the web-browser processing, receives the input designating the particular icon from the user interface; and receive an input designating one of the first content and the second content from the user interface, and wherein in the determination processing, the information processing apparatus determines the content to be transmitted to the web server, based on a content selected on the first screen, and wherein in the content acquisition processing, when the first content is determined to be transmitted to the web server in the determination processing, the information processing apparatus requests the scan-driver executing device to create the reading data and acquires the reading data from the scan-driver executing device.

* * * * *